(12) United States Patent
Hung

(10) Patent No.: US 6,199,809 B1
(45) Date of Patent: Mar. 13, 2001

(54) SUPPORT DEVICE FOR KEYBOARD

(76) Inventor: May Chung Hung, 8F-3, No. 312, Jr Sheng Road, Juo Yin Chu, Kaohsiung, 813 (TW)

( * ) Notice: Subject to any disclaimer, the term of this patent is extended or adjusted under 35 U.S.C. 154(b) by 0 days.

(21) Appl. No.: 09/414,571

(22) Filed: Oct. 8, 1999

(51) Int. Cl.[7] .................................................. F16M 11/10
(52) U.S. Cl. .................................. 248/284.1; 248/281.11; 248/918
(58) Field of Search ........................... 248/281.11, 291.1, 248/292.14, 918, 921, 922, 284.1, 292.11, 286.1; 108/93, 96, 138, 144.11; 312/208.1, 223.3

(56) References Cited

U.S. PATENT DOCUMENTS

| | | | |
|---|---|---|---|
| 5,037,054 | * 8/1991 | McConnell | 248/284.1 |
| 5,443,237 | * 8/1995 | Stadtmauer | 248/918 |
| 5,553,820 | * 9/1996 | Karten et al. | 248/921 |
| 5,901,933 | * 5/1999 | Lin | 248/918 |
| 5,924,666 | * 7/1999 | Liu | 248/918 |
| 5,941,497 | * 8/1999 | Inoue et al. | 248/291.1 |
| 6,021,985 | * 2/2000 | Hahn | 248/284.1 |
| 6,027,090 | * 2/2000 | Liu | 248/281.11 |
| 6,032,381 | * 3/2000 | Miller | 248/291.1 |

* cited by examiner

Primary Examiner—Ramon O. Ramirez
Assistant Examiner—Jon Szumny
(74) Attorney, Agent, or Firm—Charles E. Baxley

(57) ABSTRACT

A keyboard support device includes a frame and a link pivotally secured to a base at a pin and a shaft respectively, and a support pivotally secured to the frame. A bolt is detachably engaged through the support and the frame and the link for securing the support to the frame and the link before the support is adjusted to the required height and angular position relative to the frame. The bolt has a head secured to the support and is prevented from rotating relative to the support. A spring may elevate the support relative to the base to the required height.

8 Claims, 5 Drawing Sheets

SUPPORT DEVICE FOR KEYBOARD

BACKGROUND OF THE INVENTION

1. Field of the Invention

The present invention relates to a support device, and more particularly to a support device for a keyboard.

2. Description of the Prior Art

Typical keyboards are directly supported on the computer tables and may not be adjusted according to the sizes of various users.

The present invention has arisen to mitigate and/or obviate the afore-described disadvantages of the conventional keyboard supports.

SUMMARY OF THE INVENTION

The primary objective of the present invention is to provide a keyboard support device which may be easily adjusted to different height according to the user's size and need.

In accordance with one aspect of the invention, there is provided a keyboard support device comprising a base, a frame including a first end pivotally secured to the base at a pivot pin, and including a second end having a curved groove formed therein, a support pivotally secured to the frame at a pivot axle and including a curved groove formed therein and aligned with the curved groove of the frame, a link including a first end pivotally secured to the base at a pivot shaft and including a second end, and a fastener device engaged through the curved grooves of the support and of the frame and engaged through the second end of the link for releasably securing the support to the frame and the link.

The fastener device includes a bolt engaged through the curved grooves of the support and of the frame and engaged through the second end of the link and includes a knob threaded to the bolt for releasably securing the support to the frame and the link. One or more spacers are further engaged between the link and the support. The bolt includes a first end extended outward of the support, the fastener device includes a sleeve engaged on the bolt and engaged between the knob and the support.

The fastener device includes a bar secured between the pivot axle and the bolt, the bar includes a non-circular cavity formed therein, the bolt includes a non-circular latch formed thereon and engaged with the cavity for securing the bolt to the bar and for preventing the bolt from rotating relative to the support.

A spring biasing means is further provided for biasing the frame and the link to rotate relative to the pivot pin and the pivot shaft respectively and to elevate the support relative to the base. The biasing means is engaged between the pivot shaft and the frame. The frame includes an ear extended therefrom, the biasing means is engaged between the pivot shaft and the ear of the frame.

The biasing means includes a barrel, and a tube slidably received in the barrel, and a spring engaged between the barrel and the tube for biasing the tube outward of the barrel. The barrel of the biasing means includes a hook for detachably securing to the pivot shaft. The tube includes a projection for detachably engaging with the ear of the frame.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
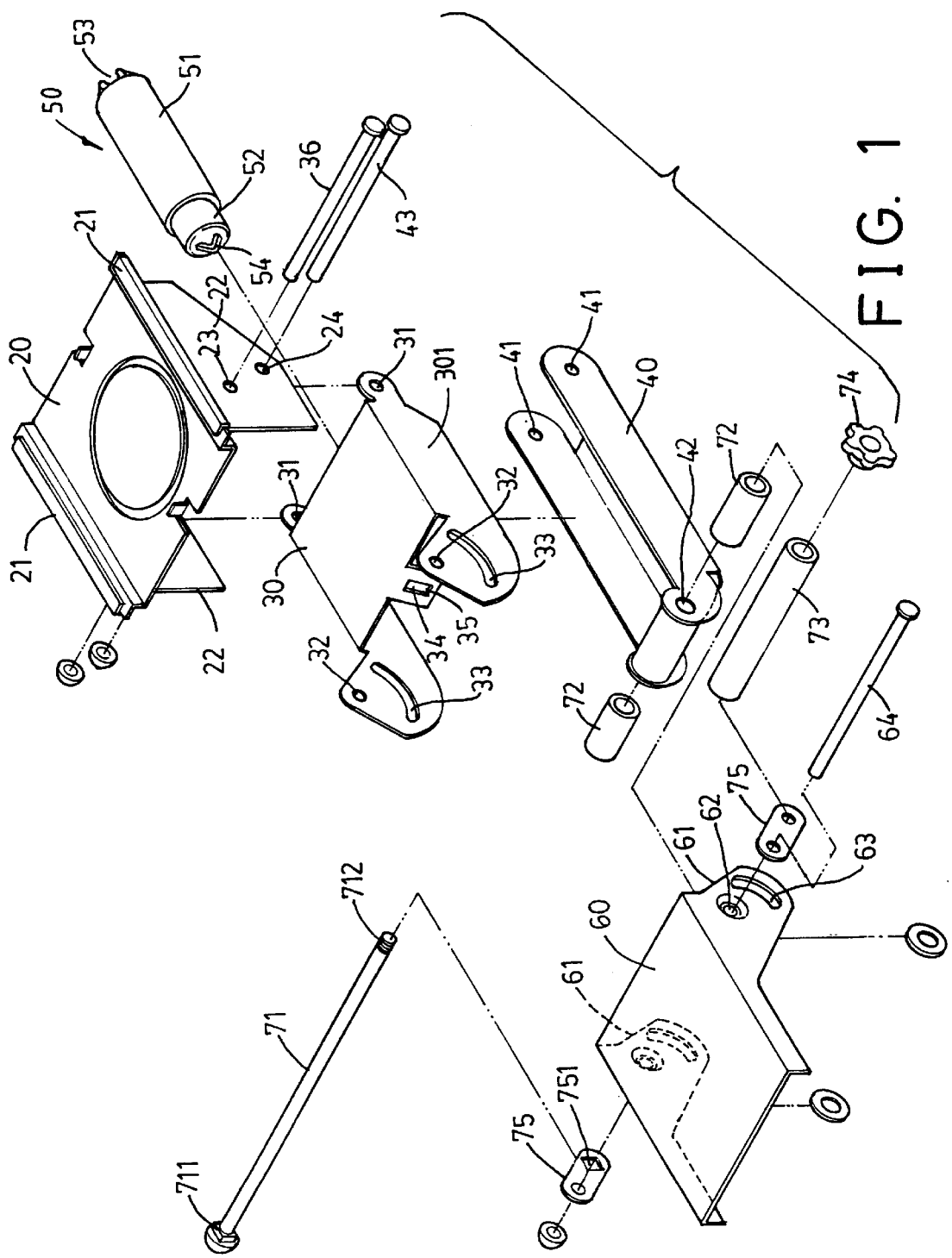
FIG. 1 is an exploded view of a keyboard support device in accordance with the present invention.
Figure 2:
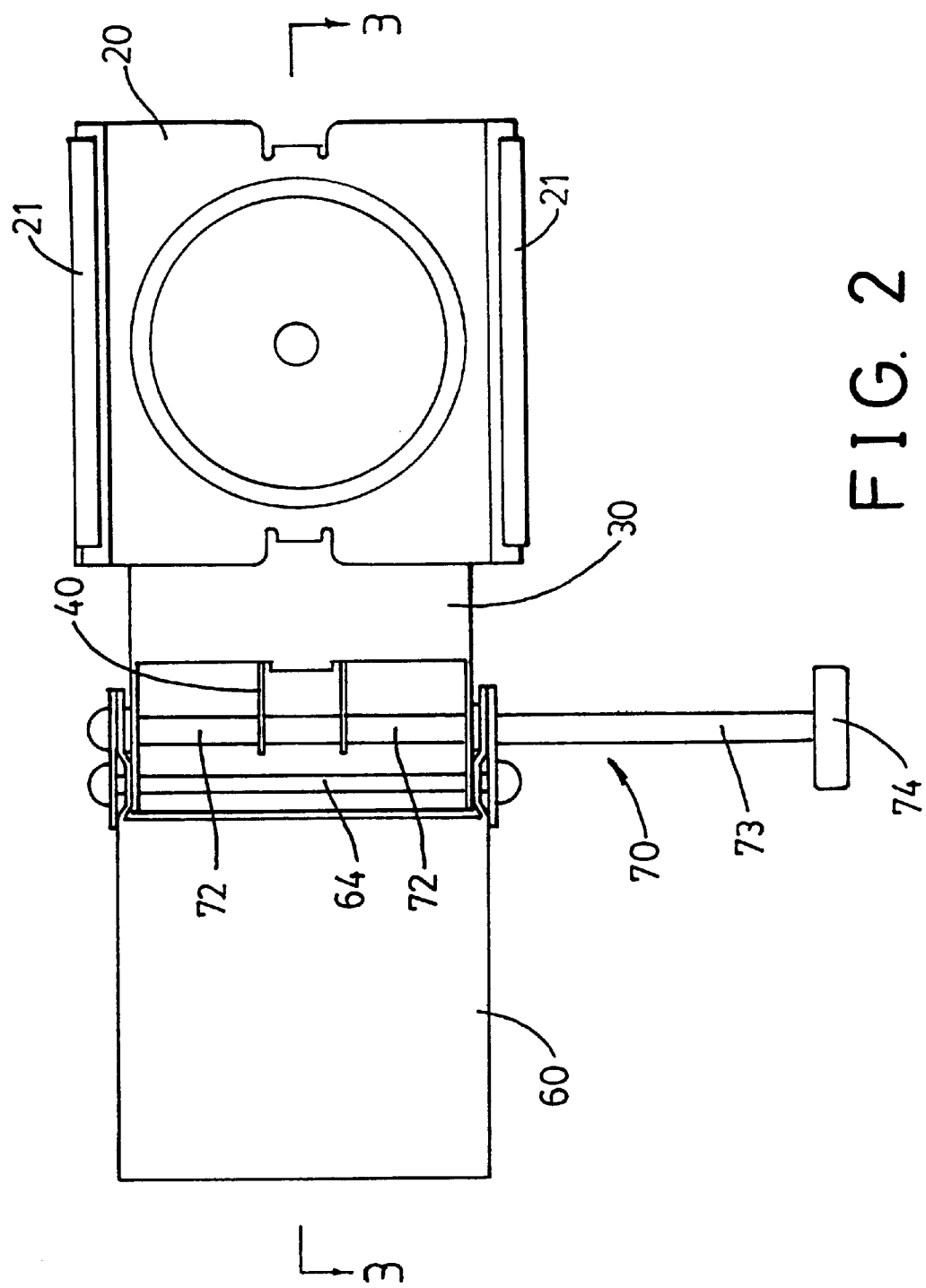
FIG. 2 is a top view of the keyboard support device.
Figure 3:
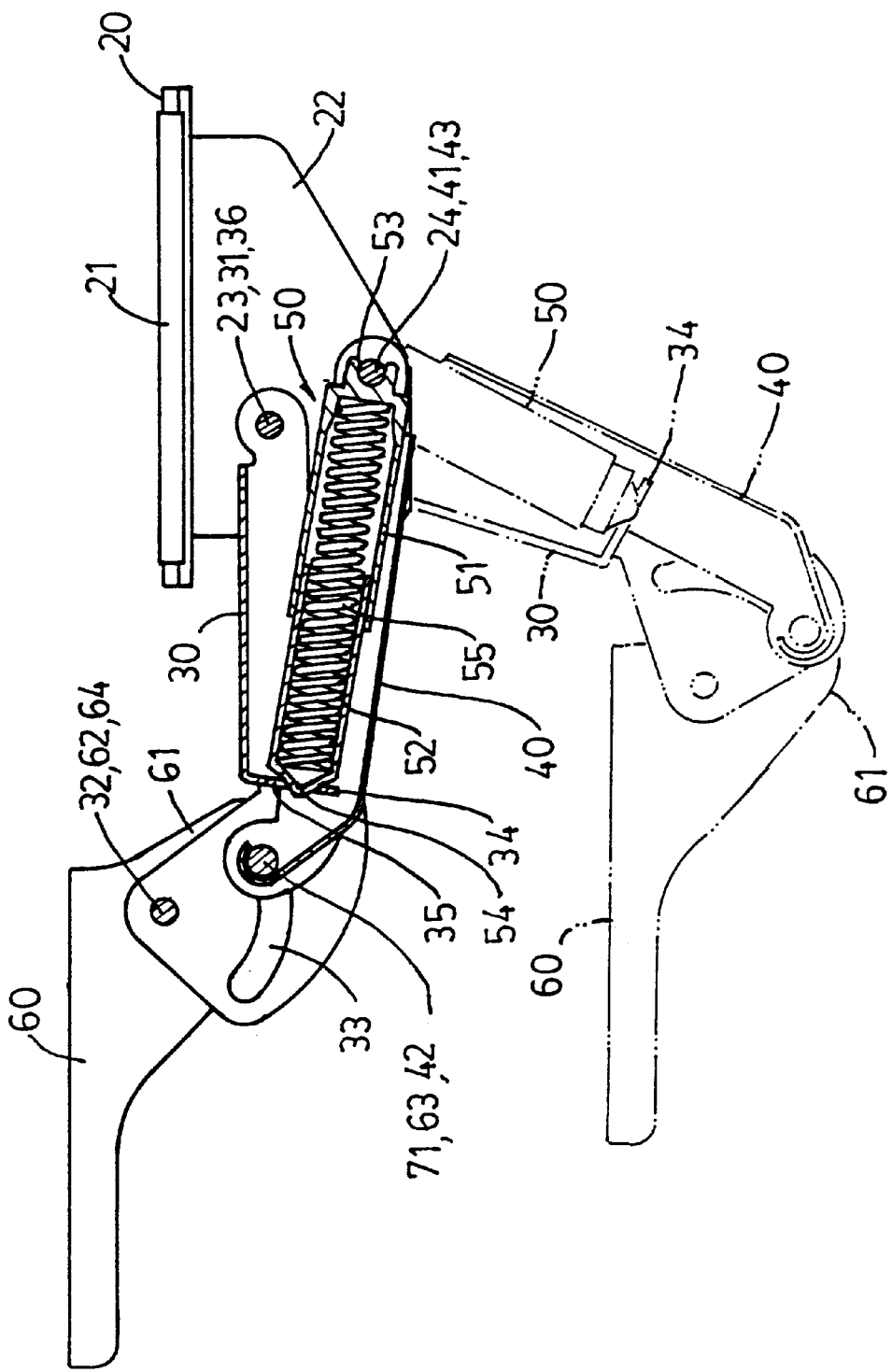
FIG. 3 is a cross sectional view taken along lines 3—3 of FIG. 2.
Figure 4:
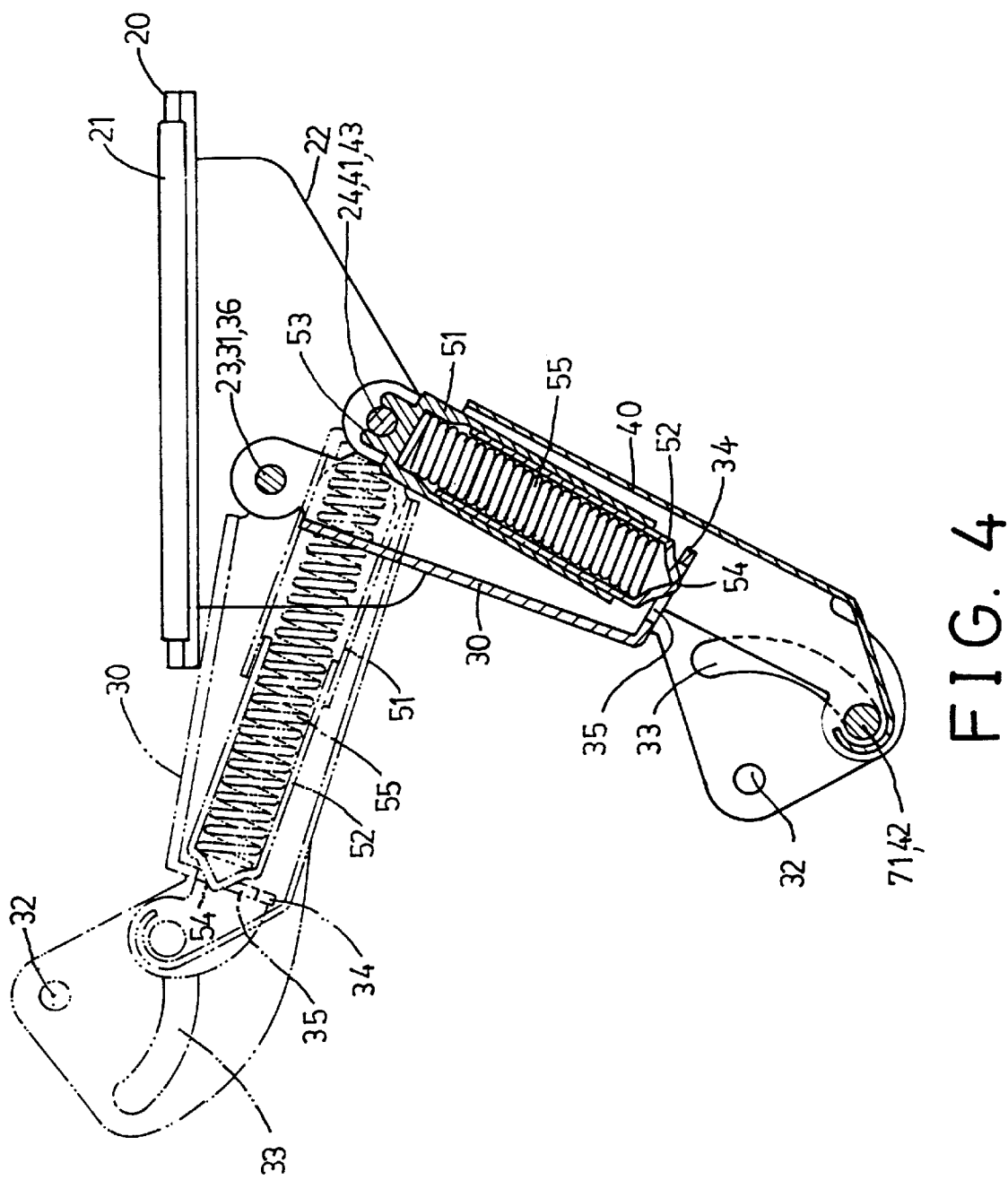
FIG. 4 is a cross sectional view similar to FIG. 3, illustrating the operation of the keyboard support device.

Referring to the drawings, and initially to FIGS. 1–3, a keyboard support device in accordance with the present invention comprises a base 20 including one or more channels 21 formed therein for attaching to a track device that is attached to a support member, such as the computer or the computer desk etc. The base 20 includes a pair of plates 22 extended downward therefrom and parallel to each other. A pin 36 and a shaft 43 are secured between the plates 22 and engaged with the holes 23, 24 of the plates 22. A frame 30 includes one end 31 pivotally secured to the pin 36, and includes the other end having an ear 34 extended therefrom, and includes a pair of panels 301 extended downward therefrom and parallel to the plates 22 of the base 20. The other ends of the panels 301 of the frame 30 each includes an orifice 32 and an oblong and curved groove 33 formed therein. The ear 34 of the frame 30 includes an opening 35 formed therein.

A support 60 includes one end pivotally secured to the other end of the frame 30 at a pivot axle 64 which is engaged through the hole(s) 62 of the flaps 61 of the support 60 and engaged through the orifices 32 of the frame 30. The support 60 includes one or more curved grooves 63 formed in the flap(s) 61 and aligned with the curved grooves 33 of the frame 30. A link 40 includes one end 41 pivotally secured to the base 20 at the pivot shaft 43 and includes an aperture 42 formed in the other end thereof. A bolt 71 is engaged through the flaps 61 of the support 60 and engaged through the curved grooves 63, 33 of the support 60 and of the frame 30, and engaged through the aperture 42 of the link 40 for pivotally securing the link 40 and the frame 30 and the support 60 together. Two spacers 72 are engaged on the bolt 71 and engaged between the link 40 and the flaps 61 of the support 60 for forming a solid structure between the support 60 and the link 40. A sleeve 73 is further engaged onto one end of the bolt 71 that is extended outward of the support 60 (FIG. 5).

One or more bars 75 are secured between the pivot axle 64 and the bolt 71. One of the bars 75 includes a cavity 751 having a non-circular cross section formed therein, and preferably having a square cross section formed therein. The bolt 71 includes a head or a latch 711 of a non-circular cross corresponding to that of the cavity 751 of the bar 75, and particularly of a square cross section for engaging into the square cavity 751 of the bar 75 and for preventing the bolt 71 from rotating relative to the bar 75 and the support 60. The bolt 71 includes an outer thread 712 formed in the other end opposite to the latch 711 and threaded with a knob 74 which may be threaded relative to the bolt 71 for securing the bolt 71 to the support 60 and/or the frame 30 and/or the link 40, by the engagement of the spacers 72 between the frame 30 and the link 40 and by the engagement of the sleeve 73 onto the bolt 71 and with the support 60. A spring biasing device 50 includes a barrel 51 having a hook 53 provided in one end for rotatably engaging onto the shaft 43, and includes a tube 52 slidably engaged in the barrel 51 and having a projection 54 extended therefrom for engaging into the opening 35 of the ear 34 of the frame 30. A spring 55 is engaged between the barrel 51 and the tube 52 for biasing the tube 52 outward of the barrel 51 and for applying a biasing force against the shaft 43 and the ear 34 of the frame 30 and for moving the support 60 upward.

It is to be noted that the frame 30 and the link 40 form a triangle such that the support 60 may be solidly secured to the frame 30 and the link 40 by the bolt 71, without the spring device 50. The spring device 50 may be easily and detachably engaged between the shaft 43 and the ear 34 of the frame 30, without addition tools, for applying a spring biasing force against the frame 30 and for elevating the support 60 upward to the upper position relative to the base 20. The support 60 may be rotated and adjusted relative to the frame 30 by the sliding engagement of the bolt 71 in the curved grooves 33, 63 of the frame 30 and of the support 60, when the frame 30 and the link 40 are rotated relative to the base 20 to various positions, for allowing the support 60 to be adjusted and maintained in a horizontal position.

Figure 5:
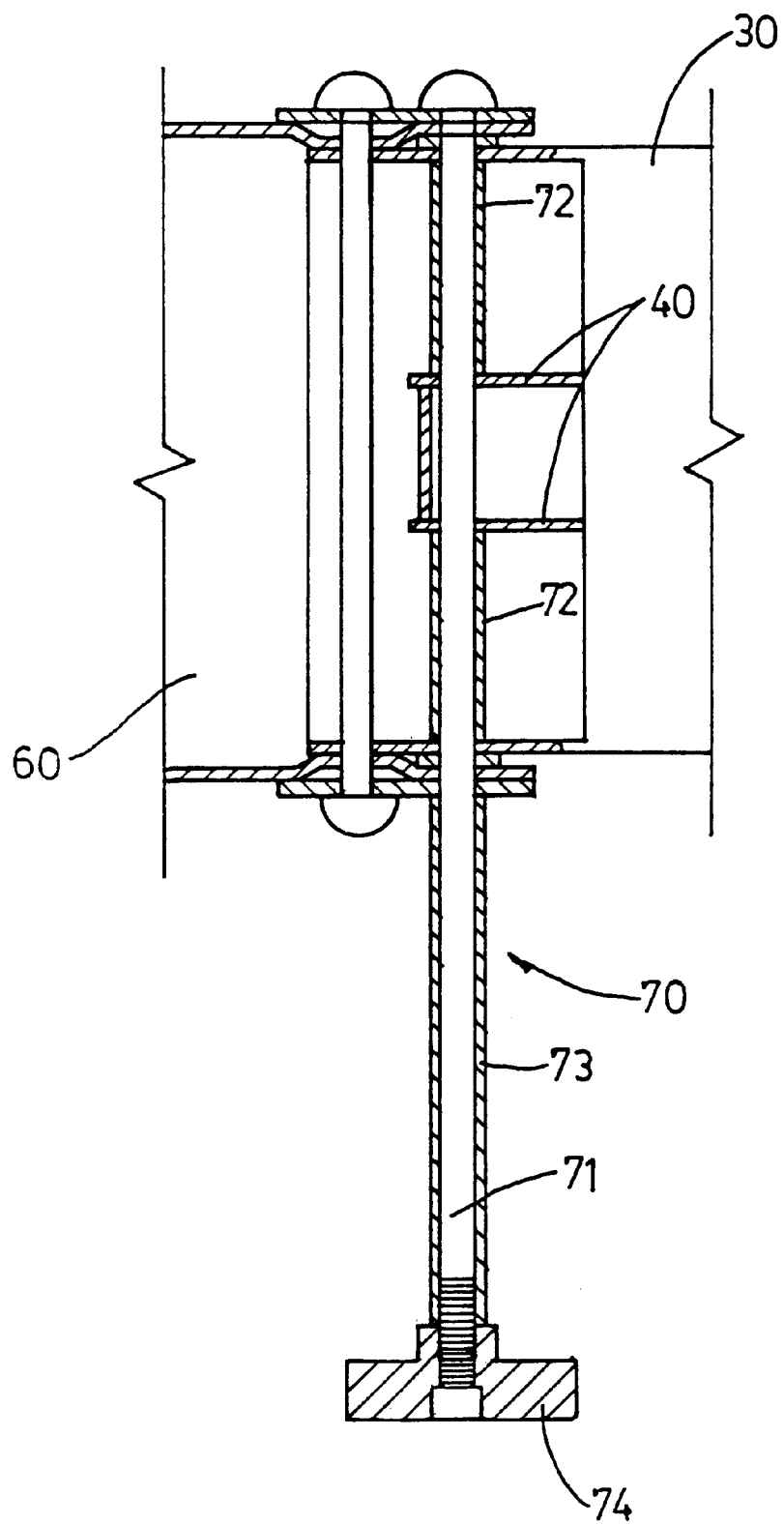
FIG. 5 is a partial cross sectional view illustrating the operation of the keyboard support device.

In operation, as shown in FIG. 5, when the knob 74 is unthreaded relative to the bolt 71, the support 60 may be released and adjusted relative to the frame 30 and the link 40, and the frame 30 and the link 40 may be rotated relative to the base 20 to the suitable angular position before the knob 74 is threaded onto the rod 71 again to secure the support 60 to the frame 30 and the link 40 again. The support 60 may be supported in place and adjusted relative to the frame 30 and the link 40 with or without the spring device 50.

Accordingly, the keyboard support device in accordance with the present invention may be easily adjusted to different height according to the user's size and need.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A keyboard support device comprising:

a base, a frame including a first end pivotally secured to said base at a pivot pin, and including a second end having a curved groove formed therein, a support pivotally secured to said frame at a pivot axle and including a curved groove formed therein and aligned with said curved groove of said frame, a link including a first end pivotally secured to said base at a pivot shaft and including a second end, and a fastener device engaged through said curved grooves of said support and of said frame and engaged through said second end of said link for releasably securing said support to said frame and said link, said fastener device including a bolt engaged through said curved grooves of said support and of said frame and engaged through said second end of said link and including a knob threaded to said bolt for releasably securing said support to said frame and said link, said fastener device including a bar secured between said pivot axle and said bolt, said bar including a non-circular cavity formed therein, said bolt including a non-circular latch formed thereon and engaged with said cavity for securing said bolt to said bar and for preventing said bolt from rotating relative to said support.

2. The keyboard support device according to claim 1 further including at least one spacer engaged between said link and said support.

3. The keyboard support device according to claim 1, wherein said bolt includes a first end extended outward of said support, said fastener device includes a sleeve engaged on said bolt and engaged between said knob and said support.

4. The keyboard support device according to claim 1 further comprising means for biasing said frame and said link to rotate relative to said pivot pin and said pivot shaft respectively and to elevate said support relative to said base.

5. The keyboard support device according to claim 4, wherein said biasing means is engaged between said pivot shaft and said frame.

6. The keyboard support device according to claim 5, wherein said frame includes an ear extended therefrom, said biasing means is engaged between said pivot shaft and said ear of said frame.

7. A keyboard support device comprising:

a base, a frame including a first end pivotally secured to said base at a pivot pin, and including a second end having a curved groove formed therein, a support pivotally secured to said frame at a pivot axle and including a curved groove formed therein and aligned with said curved groove of said frame, a link including a first end pivotally secured to said base at a pivot shaft and including a second end, a fastener device engaged through said curved grooves of said support and of said frame and engaged through said second end of said link for releasably securing said support to said frame and said link, means for biasing said frame and said link to rotate relative to said pivot pin and said pivot shaft respectively and to elevate said support relative to said base, said biasing means being engaged between said pivot shaft and said frame, said biasing means including a barrel, and a tube slidably received in said barrel, and a spring engaged between said barrel and said tube for biasing said tube outward of said barrel.

8. The keyboard support device according to claim 7, wherein said barrel of said biasing means includes a hook for detachably securing to said pivot shaft.

* * * * *